United States Patent Office 3,416,994
Patented Dec. 17, 1968

3,416,994
CROSS-LINKED POLYIMIDE
John R. Chalmers, Wallingford, and Claus Victorius, Media, Pa., assignors to E. I. du Pont de Nemours and Company, Wilmington, Del., a corporation of Delaware
No Drawing. Continuation-in-part of application Ser. No. 320,937, Nov. 1, 1963. This application Jan. 12, 1967, Ser. No. 608,735
16 Claims. (Cl. 161—227)

ABSTRACT OF THE DISCLOSURE

New polyimides having the structural formula,

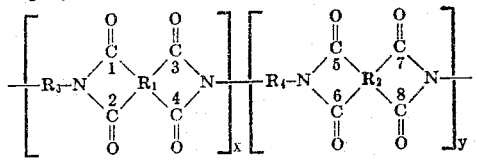

which are cross-linked at $R_1$, $R_2$, $R_3$ or $R_4$, and a process for producing them which comprises reacting a diamine and a dianhydride of a tetracarboxylic acid, the diamine or diester containing an aromatic keto group, and the diamine being present in an amount of at least 15% molar excess.

RELATED APPLICATIONS

This application is a continuation-in-part of applicants' prior filed, copending United States application, Ser. No. 320,937, filed Nov. 1, 1963, now abandoned.

SUMMARY OF THE INVENTION

This invention pertains to a new class of polymers and more particularly to a new cass of polyimides having unique properties.

In accordance with this invention there are provided polymers characterized by the recurring structural units:

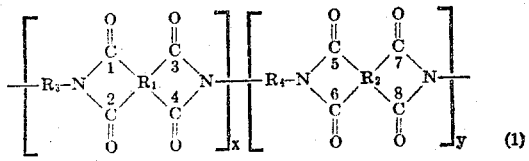 (1)

where $R_1$, $R_2$, $R_3$ and $R_4$ are the same or different, except as noted below, and can be aliphatic, aromatic, carbocyclic or heterocyclic radicals or contain one or more of such radicals. At least one of $R_1$, $R_2$, $R_3$ and $R_4$ must contain an aromatic keto-carbon atom

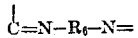

attached directly to a $=N-R_6-N=$ thereby forming the group $$\overset{|}{C}=N-R_6-N=$$

the carbon atom in the later group connecting an aromatic ring directly to another carbon atom and the unsatisfied nitrogen bonds being attached to an adjacent unit in the polymer, as for example by attachment to another aromatic keto-carbon atom in another $R_{1-4}$ group or to a carbonyl pair in an adjacent unit of the polymer and corresponding to the pairs 1,2 and 7,8 to form an imide ring. $R_6$ is the same as or different from $R_3$ and $R_4$.

In the above structural formula, $R_1$ and $R_2$ are organic radicals with the carbonyl groups 1,2; 3,4; 5,6; and 7,8 attached directly to adjacent carbon atoms. Preferably $R_1$, $R_2$, $R_3$ and $R_4$ are aromatic radicals because these provide the highest softening polymers. It will be obvious to a skilled chemist that the sequence of the bracketed units in the above formula can be regular or irregular depending upon the character of the reactants utilized in preparing the polymer. The notations $x$ and $y$ are whole numbers representing the number of bracketed units present. The values of $x$ and $y$ will depend upon the quantities of reactants, corresponding to the structural units within the respective brackets, which are reacted in accordance with this invention. The value of $x$ will always be at least one and usually large and $y$ will be at least one but theoretically, can be zero. From a practical standpoint both $x$ and $y$ are usually large whole numbers. Thus in a simple reaction involving only two reactants such as the dianhydride of 3, 3', 4, 4'-benzophenonetetracarboxylic acid and 4,4'-oxydianiline $R_1$ and $R_2$ will have the formula

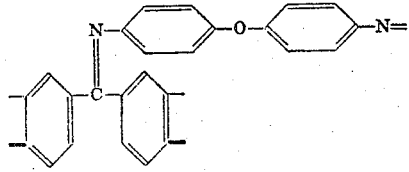

$R_3$, $R_4$ and $R_6$ will have the formula

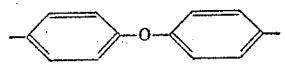

The $x$ bracketed unit can be the same as the $y$ bracketed unit if sufficient diamine is present, in which case the polyimide will have the following reatively simple structure:

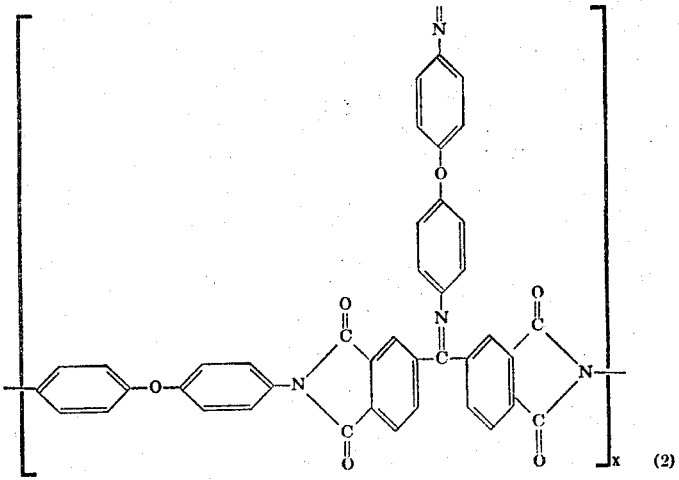 (2)

where the unsatisfied bonds of the N-atoms serve to cross-link the indicated structure to another unit of the polymer by reaction with or attachment to one or more carbonyl groups.

It will be noted that in Formula 2 each linearly recurring unit (within the brackets) is cross-linked by the

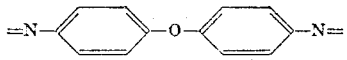

group. Normally some of these units will not be cross-linked but will simply contain a =O group in place of the cross-linking group. The amount of diamine in the reaction mixture will, of course, govern the degree of cross-linking and it is important that a molar excess of at least 15% of the diamine based on the dianhydrides utilized, be present in the reaction mixture. Preferably a 20–50% molar excess of the diamine is present on this basis, and usually there is no advantage in using more than 100% molar excess of diamine.

The term "aromatic keto carbon atom" as used herein refers to a keto carbon atom

attached directly to an aromatic ring carbon atom and to another carbon atom as in the case of benzophenone and acetophenone. The carbonyl groups in the heterocyclic imide or anhydride rings of the above formulas do not contain aromatic carbon atoms. The terms "aromatic ring" and "aromatic radical" refer to rings and radicals containing benzenoid unsaturation.

Representative of $R_1$ and $R_2$ groups in Formula 1 are the following:

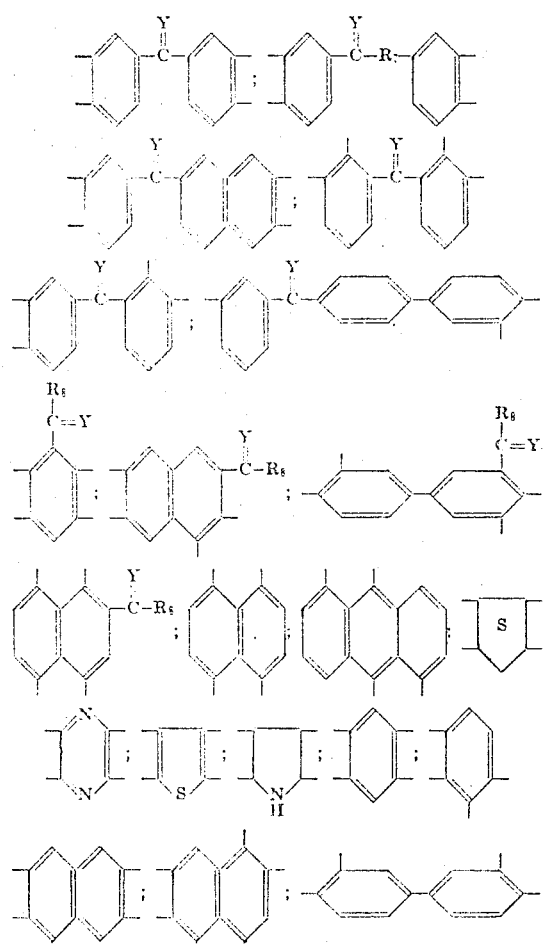

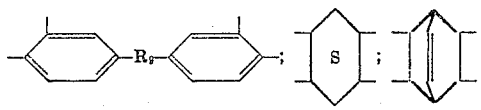

where Y is =O, =N—$R_6$—N= or =N—$R_6$—NH$_2$; $R_6$ is an alkylene, arylene, heterocyclic or carbocyclic group; $R_7$ is preferably alkylene or arylene; $R_8$ is an alkyl group and $R_9$ can be any innocuous divalent radical such as alkylene, arylene, —O—,

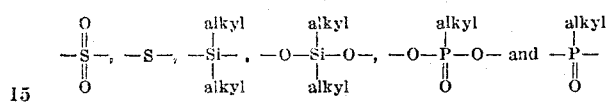

The alkyl groups indicated in these latter radicals can be replaced by aryl such as phenyl. As indicated by the above formulas the peri positions of compounds such as naphthalene and anthracene are adjacent carbon atoms for purposes of this invention.

The radicals represented by $R_3$, $R_4$ and $R_6$ are divalent organic radicals capable of forming a diamine and which can be aliphatic, aromatic, carbocyclic or heterocyclic. Representative of such radicals are the divalent radicals corresponding to the $R_1$ and $R_2$ radicals mentioned above, but the preferred radicals are illustrated by the following:

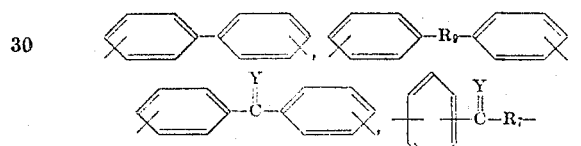

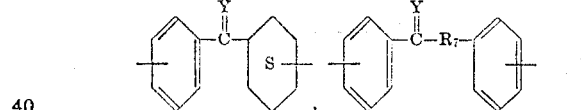

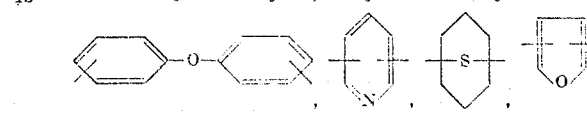

where Y, $R_7$ and $R_9$ have the same significance as above and the notation S within a ring denotes a saturated ring.

The terms "alkyl" and "alkylene," as used herein, are preferably groups with less than seven carbon atoms but larger groups may be utilized if the inconvenience involved is not determinative. Similarly, aryl and arylene groups are preferably phenyl and phenylene, respectively, but larger groups can be utilized. Also alkyl substituted aryl and arylene groups and aryl substituted alkyl and alkylene groups can be used. Also, any of $R_{1-9}$ can include diverse innocuous substituents such as fluoride, chloride, bromide, $NO_2$, COOH, COOZ, where Z is alkyl, aryl, alkaryl, aralkyl, etc.

The polymides of this invention are cross linked and are prepared from polyamic acids which in turn are formed by reacting a diamine with a dianhydride of a tetracarboxylic acid, the dianhydride having the structural formula

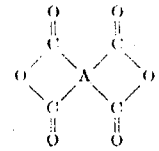

where A is $R_1$ or $R_2$ as defined above with Y being =O, that is, with carbonyl

groups in place of any amino substituted keto carbon atoms

in $R_1$ and $R_2$ and said diamine having the formula $H_2N-M-NH_2$ where M is a divalent organic radical $R_{3-4}$ as defined above with Y being =O, that is, with carbonyl

groups in place of any amine substituted keto carbon atoms

in $R_{3-4}$; at least one of A and M containing an aromatic keto group, said diamine being present in the reaction mixture in at least 15% molar excess based on the dianhydride present, and the total components containing the aromatic keto group being present in the mixture in an amount of at least 30 molar percent of the dianhydride present.

This reaction is carried out in an organic solvent for at least one of the reactants, preferably for both, the solvent being inert to the reactants and preferably anhydrous. The reaction is carried out by heating the reactants at a temperature below 175° C. The reaction temperature and reaction period will vary with the particular combinations of reactants used and the particular solvent used. The reaction is exothermic and consequently the reaction temperature is so selected as to be adequately controllable to result in a polymer composition whereof at least 50% by weight of the structural units have the indicated polyamic acid structure, i.e., less than 50% of the units have been converted to polyimide structure. Although the reaction period may be as short as one minute, the reaction conditions are generally so selected as to provide a polymer composition of the desired characteristics which requires a reaction period usually in the range from about 30 to about 500 minutes. For the development of maximum inherent viscosity, it is usually necessary to operate at a reaction temperature below 60° C., preferably no greater than about 50° C.

The proportion of organic solvent need only be sufficient to dissolve enough of one reactant, preferably to dissolve the diamine, to initiate the reaction of the diamine and the dianhydride. For forming the polyamic acid compositions into shaped articles, most successful results are obtained when the solvent component constitutes at least 40% of the final polymer solution, i.e., the solution may contain from 0.05 to 60% of the polymer component. For coating purposes, the content of polyamic acid usually is in the range of 5% to 40%. If desired, the polyamic acid can be isolated in a stable form by precipitation from the polymer solution with a non-solvent for the polyamic acids, e.g., cyclohexanone, dioxane, benzene, etc.

Solvents which are useful in synthesizing the polyamic acid compositions by solution polymerization are substantially inert organic liquids, other than either of the polymer-forming reactants or homologs thereof, which constitute a solvent for at least one of the reactants, and contain functional groups, the functional groups being groups other than monofunctional primary and secondary amino groups and other than monofunctional dicarboxyanhydro groups. Preferably the solvent is characterized by solvency for both of the reactants and, preferably, also by solvency for the polyamic acid reaction product. A particularly useful class of solvents are the normally liquid N,N-dialkylcarboxylamides of which the lower molecular weight species are preferred, e.g., N,N-dimethylformamide and N,N-dimethylacetamide. Other solvents which may be used in the present invention are: N,N-diethylformamide, N,N - dimethylmethoxyacetamide, N-methyl-caprolactam, N,N-diethylacetamide, dimethyl sulfoxide, N-methyl-2-pyrrolidone, tetramethylurea, pyridine, dimethyl sulfone, hexamethylphosphoramide, tetramethylene sulfone, formamide, N-methylformamide, butyrolactone and N-acetyl-2-pyrrolidone, ketones such as methyl ethyl ketone, nitroalkanes such as nitroethane, nitropropane, etc. The solvents can be used alone, in combinations of solvents, or in combination with poorer solvents or non-solvents such as benzene, benzonitrile, dioxane, xylene, toluene and cyclohexane.

The tetracarboxylic acid dianhydrides which are conveniently used as starting materials for preparing polyimides of this invention have the structural formula:

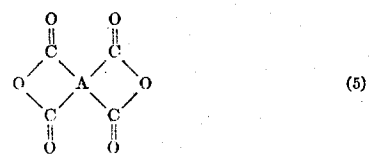

(5)

where A has the same significance as above. Particular dianhydrides suitable for use herein include:

3,3',4,4'-benzophenonetetracarboxylic dianhydride,
pyromellitic dianhydride,
3,3',4,4'-diphenyltetracarboxylic dianhydride,
1,2,5,6-naphthalenetetracarboxylic dianhydride,
2,2',3,3'-diphenyltetracarboxylic dianhydride,
4,4'-isopropylidenediphthalic anhydride,
4,4'-sulfonyl-diphthalic anhydride,
3,4,9,10-perylenetetracarboxylic dianhydride,
4,4'-oxidiphthalic anhydride,
1, 2, 4,5-naphthalenetetracarboxylic dianhydride
1,4,5,8-naphthalenetetracarboxylic dianhydride,
2,3,6,7-naphthalenetetracarboxylic dianhydride,
3,3'-isopropylidene-diphthalic anhydride,
3,3'-ethylidine diphthalic anhydride,
4,4'-ethylidene diphthalic anhydride,
3,3'-methylene diphthalic anhydride,
4,4'-methylene diphthalic anhydride,
mellophanic dianhydride,
2,3,5,6-pyrazinetetracarboxylic dianhydride,
2,3,4,5-thiophenetetracarboxylic dianhydride,
4,4'-biphthalic anhydride,
3,3'-biphthalic anhydride,
2,3,4,5-pyrrolidonetetracarboxylic dianhydride,
1,4-dimethyl-7,8-diphenylbicyclo(2.2.2)oct-7-ene-2,3,5,6-tetracarboxylic dianhydride,
1,4,7,8-tetrachlorobicyclo(2.2.2)oct-7-ene-2,3,5,6-tetracarboxylic dianhydride,
7,8-diphenylbicyclo(2.2.2.)oct-7-ene-2,3,5,6-tetracarboxylic dianhydride,
1,8-dimethyl dicyclo(2.2.2)oct-7-ene-2,3,5,6-tetracarboxylic dianhydride,
1,2,3,4-cyclopentanetetracarboxylic dianhydride.

Other dianhydrides which are useful include, in addition to 3,3',4,4-benzophenonetetracarboxylic dianhydride and its position isomers, the following:

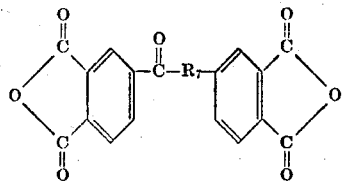

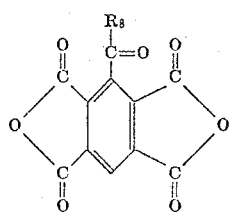

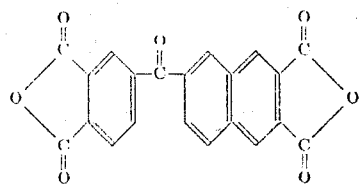

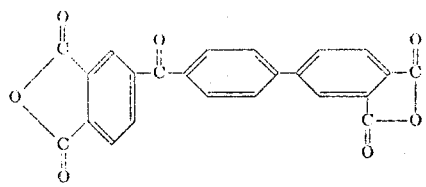

where $R_7$ and $R_8$ have the same significance as above, and the position isomers of these compounds as well as other obvious equivalents thereof such as those containing innocuous substituent groups.

The organic diamines used as starting materials for forming the products of this invention have the structural formula:

$$H_2N—M—NH_2$$

where M has the meaning set forth above. Particularly preferred diamines include: 4,4' - isopropylidene - dianiline, 4,4' - methylene - dianiline, benzidine, 3,3'-dichloro - benzidine, 4,4' - thiodianiline, 3,3' - sulfonyldianiline, 4,4' - sulfonyl - dianiline, 4,4' - oxydianiline, 1,5 - napththalene diamine, 4,4' - (diethyl silylene)dianiline, 4,4' - (diphenyl silylene)dianiline, 4,4' - (ethylphosphinylidene)dianiline, 4,4' - (phenyl phosphinylidene) dianiline, 4,4' - (N - methylamino)dianiline, 4,4 - (N - phenylamino)dianiline and mixtures thereof, metaphenylenediamine, paraphenylene diamine, 2,6 - diaminopyridine, 4,4' - methylenedicyclohexylamine, hexamethylene diamine, heptamethylene diamine, octamethylene diamine, nonamethylene diamine, decamethylene diamine 1,4-cyclohexane diamine The position isomers of these compounds such as the corresponding 2,2' - diamino 3,3' - diamino and 3,4'-(diamino compounds are also useful as starting materials Similarly diamines having the following structures can be used:

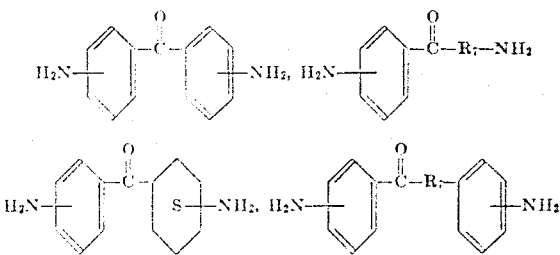

and may carry innocuous substituent groups such as halogen, hydrocarbon, alkoxy and nitrile groups.

It is essential in conducting the process of this invention that one of the dianhydrides or one of the diamines or both contain an aromatic keto group by which is meant a keto group

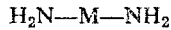

directly attached to a carbon atom in an aromatic ring and also connected to another carbon atom as, for example, in benzophenone tetracarboxylic dianhydride and acetophenone. Moreover, the dianhydride and/or diamine containing the aromatic keto group must be present in an amount of at least about 30 mole percent of total dianhydrides in the reaction mixture. Usually 40–100 mole percent of the total dianhydride and/or diamine containing the aromatic keto group is present on this basis when polymers with the most useful properties are desired. In a reaction mixture in which both dianhydride and diamine contain aromatic keto groups, the total components containing said groups must be present in an amount of at least 30 mole percent of the total dianhydrides present so that at least 20% of $R_{1-4}$ will be cross-linked.

The polyamic acid compositions prepared in accordance with this invention are in convenient form for use as an adhesive or wire enamel or preparation of shaped articles with high temperature softening points and requiring rigidity and high dielectric characteristics. Whatever the application or geometric shape utilized, the polyamic acid composition is conveniently converted to polyimides of this invention by baking initially at a temperature of about 50°–200° C. for about 200–10 minutes. In order to obtain the highest quality products the shaped solution is heated at about 80–150° C. for about 120–30 minutes or until substantially all solvent is removed and the mixture sets up and becomes firm. This "pre-bake" aids greatly in reducing brittleness and cracking in the final polymer to a minimum. Thereafter the temperature is raised to about 150–500° C. for 1000–1 minutes and preferably 200–400° C. for about 500–2 minutes or until substantially all the diamine is reacted, the lower temperatures being accorded the longer time.

It will be realized that the polyamic acid compositions of this invention may be modified by adding other monomeric or polymeric materials prior to or even after shaping into a desired form preparatory to baking. In some instances as much as 50% or more modifying material can be added. Also, of course, inert materials such as pigments, dyes, organic and inorganic fillers may be added prior to or subsequent to shaping.

Adhesive formulations based on the polyimides of this invention are normally used as liquid adhesives, unsupported film or tape, the last preferably on a woven or non-woven glass fabric carrier. Among suitable types of glass fabric are those designated commercially as Type 112 or 106. These fabrics should preferably be heat cleaned before use or else have a methacrylato chromyl chloride finish. After a tape has been impregnated with the liquid adhesive formulation the system is pre-cured for about 120–30 minutes at 50–200° C. and preferably for 60 minutes at 100° C. to remove solvent and give a tape which is easily handled and storage stable for extended periods of time. If maximum storage life is desired the tape may be refrigerated (0–10° C.). Other carriers which can be used include metal screens, Refrasil fabrics, graphite cloth, asbestos cloth, papers, films and cloth-like fabrics of high melting synthetic polymers such as wholly aromatic polyamides, polytetrafluoroethylene and the like.

Adhesive formulations of polyimides of this invention may be compounded with suitable reinforcing fillers such as aluminum dust, powdered asbestos, aluminum oxide powder, iron powder, flake glass, tin dust, zinc dust, tetraoxychromate and chromic oxide. For specific applications it may be desirable to use blends of the polyimides with other resins such as phenolic resins, epoxide resins, silicone resins and nitrogen resins. It is desirable that the resins be compatible with the particular cross-linked polyimides utilized and they may also enter into chemical combination with the reactive groups of the polyimide. Suitable compatible materials include epoxy resins of the bisphenol type such as "Epon 828," "Epon 1007" and other types of epoxy resins such as the resin having the formula type

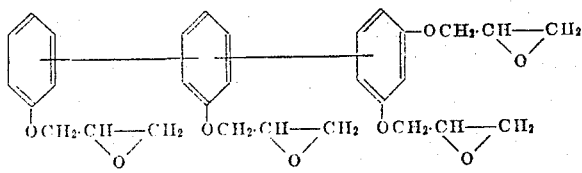

with an average molecular weight of about 500 and epoxide equivalent of about 150. Others include bisphenol-A, epoxynovolacs, polyphenylene oxides, benzoguanamine-formaldehyde resins, polyphenylenes, aliphatic polyamides, e.g., nylon resins, aromatic polyamides, e.g., m-phenylene isophthalamide and terephtalamide, polyesters, e.g., hexamethylene isophthalate, cyanurate containing polyesters, polyvinyl formal, -acetal and -butyral resins, cumarone-indene resins, polyacrylonitrile and acrylonitrile copolymers.

It may also be desirable to add heat stabilizers to the adhesive formulation for specific end use applications. Examples of such materials are arsenic thioarsenate, copper 8-quinolinolate, iron (ic) chelate of 8-hydroxyquinoline, copper diethylenetriaminedibromide, tris(chloroethyl)phosphite, phenyl phosphinic acid and arsenic pentoxide.

These adhesive formulations are of use with a variety of substrates. In general these are metals such as aluminum alloys, stainless steel, cold rolled steel, magnesium, titanium, copper, brass, galvanized iron as well as glass, ceramics, quartz, silicone resins, phenolic resins, polytetrafluoroethylene. They may also be used to adhere glass fabric, glass fabric laminates, as well as various organic polymers in the form of shaped structures such as films, filaments or coatings. Examples of such polymers are polyimides, polyamic acids, polyamides, polybenzimidazoles, polybenzthiazoles, polyoxadiazoles, polyphenyleneethers and polyesters. They metals may require surface treatments and primer coats may be used in specific instances.

Typical adhesive formulations are

I

| | Parts |
|---|---|
| Polyamic acid | 110 |
| Aluminum dust | 100 |
| Arsenic thioarsenate | 20 |
| Dimethyl acetamide | 440 |

II

| | |
|---|---|
| Polyamic acid | 110 |
| Aluminum oxide powder | 60 |
| Copper-8-quinolinolate | 1.0 |
| Dimethyl acetamide | 220 |
| Xylene | 220 |

III

| | |
|---|---|
| Polyamic acid | 110 |
| Zinc dust | 100 |
| Arsenic pentoxide | 20 |
| N-methyl pyrrolidone | 330 |
| Xylene | 110 |

These formulations are pre-cured 60 minutes at 100° C. The joint with adhesive in place is then cured 120-30 minutes at 250-350° C. and preferably 60 minutes at 300° C. Pressure (from contact up to 2500 p.s.i.) may be used at this stage. For optimum performance a post cure of about 64 hours at 260° C. is then desirable.

When particular properties are desired the polyimides of this invention may be overcoated with other polymeric materials, e.g., epoxy resins, silicone resins, phenolic resins, polyvinyl formal, acetal or butyral resins, polyurethanes, alkyds, polyamide resins, polyester resins, nitrogen resins, e.g., melamine formaldehyde, urea formaldehyde, benzoguanamine formaldehyde, polytetrafluoroethylene and copolymers.

The invention will be more clearly understood by referring to the examples which follow. All parts are by weight unless otherwise indicated.

Example 1.—Preparation of polyamic acid from 3,3',4,4'-benzophenonetetracarboxylic dianhydride and 4,4'-oxydianiline A quantity (25 parts) of 4,4'-oxydianiline dissolved in 173 parts N-methylpyrrolidone and 86 parts N,N-dimethylacetamide is charged to a flask fitted with an agitator and reflux condenser. A quantity (40.7 parts) of 3,3',4,4' - benzophenonetetracarboxylic dianhydride is added in portions with stirring. The temperature of the mixture is kept between 20° C. and 25° C. by an ice bath. Stirring is continued for 30 minutes to complete dissolution of the dianhydride. Viscosity of the polyamic acid solution (Brookfield 25° C.) is 124 poises. Inherent viscosity is 1.1 (measured at 0.5 g./100 ml. in dimethylacetamide at 25° C., 50% relative humidity). The solution is converted to a polyimide and its adhesive properties measured as shown below.

Example 1(a).—Addition of 20 mole percent excess 4,4'-oxydianiline

The solution of Example 1 (100 parts) is diluted to 12% solids by the addition of 46 parts of toluene. To a 10 part aliquot of this solution is added 0.935 part of 4,4'-oxydianiline and the mixture is converted to a clear solution by rolling for 2 hours in a closed container. This polyamic acid solution is converted to a polyimide and evaluated as an adhesive as described below.

Example 1(b).—Addition of varying excesses of 4,4'-oxydianiline

Following the procedure of Example 1(a), a series of mixtures containing (1) 33, (2) 50, (3) 67 and (4) 100 mole percent excess of oxydianiline are prepared using 10 parts aliquots in each case. These solutions are converted to polyimides and evaluated as adhesives as described below.

Example 1(c).—Addition of 33 mole percent excess 4,4'-methylene dianiline

The solution of Example 1 (100 parts) is diluted to 10% solids by the addition of 75 parts toluene. To 100 part portion of this solution is added 1.25 parts of 4,4'-methylene dianiline and the mixture is converted to a clear solution by stirring for 30 minutes in a flask. This solution is converted to a polyimide and evaluated as an adhesive as described below.

Example 2.—Preparation of polyamic acid from 3,3'-4,4'-benzophenonetetracarboxylic dianhydride and 50 mole percent excess 4,4'-oxydianiline A quantity (30 parts) of 4,4'-oxydianiline dissolved in 95 parts N-methylpyrrolidone and 47 parts N,N-dimethylacetamide is charged to a flask fitted with agitator and reflux condenser. A quantity (32.2 parts) of 3,3',4,4'-benzophenonetetracarboxylic dianhydride is added slowly with agitation, followed by a mixture of 43 parts N-methylpyrrolidone and 22 parts N,N-dimethylacetamide. The mixture is stirred for one hour and the product, a clear red-brown solution, has a viscosity of 1.5 poises (Brookfield 25° C.). This solution is converted to a polyimide and evaluated as an adhesive as described below.

Example 3.—Preparation of polyamic acid from 3,3',4,4'-benzophenonetetracarboxylic dianhydride and 4,4'-methylenedianiline A quantity (198 parts) of 4,4'-methylenedianiline along with 1956 parts of N,N'-dimethylacetamide (dried over molecular sieves) is charged to a flask equipped with agitator, nitrogen inlet and powder funnel. The mixture is stirred until the 4,4'-methylenedianiline has dissolved. A quantity (328 parts) of 3,3',4,4'-benzophenonetetracarboxylic dianhydride is added in portions over a 15 minute period while maintaining the temperature of the mixture at 27° C. Another quantity (106 parts) of N,N-dimethylacetamide is used to rinse down the equipment and then added to the reaction mixture. The mixture is stirred for 2 hours to dissolve all the solid material and produce a clear amber solution having 20% solids and 53 poises viscosity (25° C. Brookfield). This solution is converted to a polyimide and evaluated as an adhesive as shown below.

Example 3(a).—Use of varying excesses of 4,4'-methylenedianiline

The solution of Example 3 (100 parts) is diluted to 15% solids by the addition of 33 parts of toluene. Aliquots (10 parts) of this solution are used to make up a series of mixtures containing (1) 20, (2) 33, (3) 50, (4) 67 and (5) 100% molar excess of 4,4'-methylenedianiline following the procedure of Example 1(a). These solutions are converted to polyimides and evaluated as adhesives as shown below.

Example 4.—Preparation of polyamic acid from 3,3',4,4'-benzophenonetetracarboxylic dianhydride and 50 mole percent excess 4,4'-methylenedianiline A quantity of 4,4'-methylenedianiline (29.7 parts) is dissolved in 94.95 parts of N-methylpyrrolidone in a 3 neck round bottom flask fitted with agitator, nitrogen inlet and reflux condenser. A quantity (33.6 parts) of 3,3',4,4' - benzophenonetetracarboxylic dianhydride is added with stirring during which the temperature of the mixture rises from ambient to 50–55° C. and is held there for 30 minutes. The final product is a clear orange-brown solution, viscosity 510 poises (Brookfield 25° C.)

The orange-brown solution is diluted to 26% solids with 63.9 parts xylene and 21.3 parts N-methylpyrrolidone. The viscosity is then 4.5 poises.

Copper wire (#18) coated with a commercial polyimide wire enamel is formed into helical coils on a ¼" mandrel. These coils are cut into 4 inch lengths and pre-annealed in an oven for one hour at 150° C. The coils are then dipped into the solution prepared as above, allowed to remain there for 5 minutes, slowly withdrawn vertically and allowed to drain for 20 minutes. They are then baked for one hour at 150° C. After removal from the oven and cooling to ambient temperature, the procedure is repeated but with coils dipped in the reverse direction. The second 150° C. bake is followed by a final bake of 16 hours at 200° C. The average pick up of converted resin (per coil) is 0.36 gm. The coils are then tested by the Dow-Dexter bond strength test. In this test the coils are placed, individually, in a horizontal position in a special jig mounted in the jaws of an Instron tensile tester. By this means they are held in the form of a simple beam and broken by a knife edge traveling at 0.2 inch/min. The tensile load under which the coil breaks is recorded. The following results are an average of 10 determinations.

Average bond strength (25° C.)=73.7 pounds±3.2. Bond strength=206.5 pounds/gm. resin.

The solution is converted to a polyimide and evaluated as an adhesive as shown below.

Example 5.—Preparation of polyamic acid from 4,4'-methylenediphthalic anhydride and 4,4'-diaminobenzophenone A quantity (6.93 parts) of 4,4'-diaminobenzophenone along with 84 parts N,N-dimethylacetamide is charged to a reaction vessel fitted with an agitator, thermometer and nitrogen inlet. The mixture is stirred until all the solid is dissolved and 10.06 parts of 4,4'-methylenediphthalic anhydride are added. The mixture is then stirred, under nitrogen, at ambient temperature for one hour during which the temperature rises from 25.5° C. to a maximum of 28.5° C. The solution has a viscosity of 8.84 poises (Brookfield 25° C.) and an inherent viscosity (C.=0.5 g./100 ml. in dimethylacetamide at 25° C.)=0.79. This solution is converted to a polyimide and evaluated as an adhesive as shown below.

Example 5(a).—Addition of 33 mole percent excess 4,4'-methylenedianiline

A quantity (0.216 part) of 4,4'-methylenedianiline is added to 10 parts of the solution of Example 5 and thoroughly mixed by rolling the container for 2 hours until all the solid is dissolved. This solution is converted to a polyimide and evaluated as an adhesive as described below.

Example 5(b).—Addition of 33 mole percent excess 4,4'-diaminobenzophenone

A quantity (0.234 part) of 4,4'-diaminobenzophenone is added to 10 parts of the solution of Example 5. This solution is converted to a polyimide and evaluated as an adhesive as described below.

Example 6.—Preparation of polyamic acid from 4,4'-methylenediphthalic anhydride and 4,4'-oxydianiline A quantity (10 parts) of 4,4'-oxydianiline along with 79 parts of N,N-dimethylacetamide is charged to a reaction vessel fitted with an agitator and nitrogen inlet. The mixture is stirred until all the solid is dissolved and 15.4 parts of 4,4'-methylenediphthalic anhydride is added along with 50 parts of N,N'-dimethylacetamide. The mixture is stirred under nitrogen for one hour until all the solid is dissolved. The solution has a viscosity of 4.15 poises and an inherent viscosity (C.=0.5 g./100 ml. in dimethylacetamide at 25° C.) of 1.1. This solution is converted to a polyimide and evaluated as an adhesive as shown below.

Example 6(a).—Addition of varying excesses of 4,4'-oxydianiline

The solution of Example 6 (100 parts) is diluted to 15% solids by the addition of 10 parts of toluene. Aliquots (10 parts) of this solution are used to make up samples containing (1) 20 and (2) 50 mole percent excess 4,4'-oxydianiline, following the procedure of Example 1(a). These solutions are converted to polyimides and evaluated as adhesives as shown below.

Example 7

Glass fabric (type shown in the table) is impregnated with the solutions of Examples 1(a), 1(b), 3(a)-2 and 4 and baked 15 minutes at 150° C. This coated fabric is made into laminates and tested for flexural strength at various temperatures. Results are summarized in the following table:

| Percent resin content | Fabric | No. of plies | Laminating conditions, min./° C./p.s.i. | Flexural strength, p.s.i. ×10⁻³ | | |
|---|---|---|---|---|---|---|
| | | | | 25° C. | 288° C. | 371° C. |
| 30.5 [1] | (A) | 2 | 20×371×200 | 39.5 | 17.8 | 15.2 |
| 49.2 [1] | (A) | 6 | 30×371×200 | 39.3 | | 14.6 |
| 36.0 [1] | (B) | 14 | 60×371×200 | 31.8 | 24.5 | |
| 30.0 [1] | (C) | 14 | 60×371×200 | 42.0 | 34.1 | |
| 37.8 [2] | (A) | 6 | 30×371×200 | 30.1 | | 9.7 |
| 31.1 [3] | (A) | 6 | 30×371×200 | 47.0 | | 5.5 |
| 32.4 [3] | (A) | 14 | 60×371×200 | 36.0 | 15.8 | |
| 25.7 [3] | (B) | 14 | 60×371×200 | 40.4 | 15.4 | |
| 31.2 [4] | (A) | 6 | 60×371×200 | 26.2 | | 10.9 |
| 35.7 [5] | (A) | 6 | 60×371×200 | 26.5 | | 13.9 |
| 27.0 [5] | (A) | 2 | 20×371×200 | 33.4 | 19.8 | 10.1 |
| 30.6 [6] | (A) | 6 | 30×371×200 | 27.2 | | 11.4 |

[1] Solution of Example 4.
[2] Solution of Example 3(a)-2.
[3] Solution of Example 1.
[4] Solution of Example 1(a).
[5] Solution of Example 1(b)-1.
[6] Solution of Example 1(b)-2.
(A) 181-E glass A-1100 finish.
(B) 181-S 994 glass HTS finish.
(C) 181-E glass-heat cleaned.

Example 8.—Evaluation of adhesives on aluminum substrates

4" x 1", 0.063" thick strips of clad 2024–T3 aluminum alloy are vapor degreased with trichloroethylene, dried, etched to a length of one inch from one end in a chromic acid solution for 10 minutes at 66–71° C., rinsed with deionized water and dried in an air oven at 60° C. The adhesive solution is painted on one side of the etched end of the aluminum strips with a camel's hair brush, and the strips are dried for one hour in a 100° C. air oven. The dried strips are laid up in pairs, with the coated sides in contact, into joints having 0.5" overlap and cured in a press equipped with electrically heated platens for one hour at 300° C. and 200 p.s.i.

Adhesive joints are tested by shearing in the Instron Tensile Tester at 0.02"/min. at 25° C., 50% relative humidity or at 0.05"/min. at 300° C.

RESULTS (JOINT STRENGTH IN P.S.I.)

| Sample | Test temperature | |
|---|---|---|
| | 25° C. | 300° C. |
| Example 1 (control) | 952 | 334 |
| Example 1(b)-1 | 1,060 | 988 |
| Example 1(c) | 1,010 | 1,072 |
| Example 3(a)-3 | 1,774 | (¹) |

¹ Aluminum fails.

Example 9.—Evaluation of adhesives on stainless steel substrates

Some 4 x 1", 0.50" thick 17–7 PH stainless steel strips (Condition A) are vapor degreased with trichloroethylene, dried, immersed for 10 minutes in alkaline detergent solution at 75° C., rinsed with water and dried in a circulating air oven at 93° C. They are then etched up to a line one inch from one end (by immersion) in a sulfuric acid solution for 10 minutes at 68° C., followed by 10 minute immersion in a hydrofluoric-nitric acid solution at room temperature. This is followed by rising in distilled water and drying in an air oven at 93° C.

The etched ends are coated on one side with the adesive solutions below by painting with a camel's hair brush. The coated strips are dried for 30 minutes at 100° C., laid up by twos into joints with 0.50" overlap and cured in a press for one hour at 300° C. and 200 p.s.i. pressure. They are then post-cured for 64 hours at 260° C.

Adhesive joints are tested by shearing in the Instron Tensile Tester at 0.05"/min. at 25° C., 300° C. and 371° C.

RESULTS (JOINT STRENGTH IN P.S.I.)

| Sample | Test temperature | | |
|---|---|---|---|
| | 25° C. | 300° C. | 371° C. |
| Example 1 (control) | 1,886 | 236 | 184 |
| Example 1(a) | 1,736 | 1,000 | 700 |
| Example 1(b)-1 | 1,554 | 1,370 | 1,020 |
| Example 1(b)-2 | 1,656 | 1,402 | 744 |
| Example 1(b)-3 | 1,450 | 1,292 | 908 |
| Example 1(b)-4 | 1,582 | 1,324 | 1,216 |
| Example 2 | 1,528 | 1,324 | 736 |
| Example 3 (control) | 772 | 90 | 0 |
| Example 3(a)-1 | 2,270 | 1,680 | 540 |
| Example 3(a)-2 | 1,866 | 1,746 | 744 |
| Example 3(a)-3 | 1,752 | 1,642 | 956 |
| Example 3(a)-4 | 1,754 | 1,316 | 1,036 |
| Example 3(a)-5 | 1,804 | 1,168 | 912 |
| Example 4 | 1,854 | 1,472 | 860 |
| Example 5 (control) | 1,700 | 190 | |
| Example 5(a) | 2,010 | 1,040 | |
| Example 5(b) | 2,060 | 710 | |
| Example 6 (control) | 1,130 | 100 | |
| Example 6(a)-1 (control) | 2,270 | 230 | 80 |
| Example 6(a)-2 (control) | 1,640 | 260 | 0 |

Example 10

A polyamic acid composition containing 35 mole percent excess diamine is prepared by stirring at room temperature in dimethylacetamide 20% by weight of an equimolar mixture of 3,3',4,4'-benzophenonetetracarboxylic acid dianhydride and 4,4'-methylenedianiline. To a 50 part portion of the resulting solution is added 6.26 parts of a 20% solution of 4,4'-methylenedianiline in dimethylacetamide. A 25 part portion of this solution is then placed in a cylindrical reaction vessel along with 15 parts xylene, 1 part arsenic thioarsenate and glass beads. The vessel is then rolled for about 20 hours to form a fine dispersion of the arsenic thioarsenate. Five parts of aluminum dust are then added and dispersed by rolling the cylindrical vessel for another 30 minutes following which the reaction mixture is filtered.

A piece of heat-cleaned glass cloth (referred to commercially as 112–112E glass cloth) is stretched over a metal frame and coated with the filtered dispersions by brushing 3 coats on each side of the cloth. The coated cloth is baked for 12 minutes at 200° F. after each coat prior to the last and further baked one hour at 200° F. after the last coat. The resulting coated cloth was evenly coated, rather stiff and non tacky with a loading $$\left(\frac{\text{weight of resin}}{\text{weight of cloth plus resin}} \times 100\right)$$

of 54%.

A 7⅝" x ⅝" strip of the above coated fabric is used to laminate two pre-cut panels of 17–7 PH stainless steel heat hardened to condition TH 1050. The laminating bond is cured for one hour at 575° F. and 200 p.s.i. and post-cured in a circulating air oven for 64 hours at 260° C. The panels are then cut into 7 individual joints, the average adhesive thickness of the joints being 4 mils. The joints are tested for tensile shear strength by means of an Instron Tensile Tester using a cross head speed of 0.02 inch per minute, with the following results:

| Temperature: | Average tensile shear, p.s.i. |
|---|---|
| 25° C. | 3,080 |
| 288° C. | 1,330 |
| 371° C. | 550 |

Example 11

The solution of Example 3—186 parts is treated with 29.5 parts of a 4,4'-methylene dianiline solution, 20% by weight in N,N'-dimethylacetamide, and used in each of (a) and (b) below.

(a) To 7 parts of this solution, 3 parts of a 20% solution of a butylated phenolic resin in N,N'-dimethylacetamide are added. This blend is then painted onto 112–112E glass cloth, and dried by baking for 60 minutes at 200° F. Resin pick-up as described in Example 10 is 49.6%. Aluminum strips of the type in Example 8 are used to prepare joints with 0.50 inch overlap and cured in a press for one hour at 300° C. and 200 pounds per square inch pressure. The adhesive joints are tested in the Instron Tensile Tester at 0.05 inch per minute at 77° F. and 550° F.

Average tensile shear strength obtained:

1,362 p.s.i. at 25° C.
916 p.s.i. at 288° C.

(b) To 7 parts of the solution, 3 parts of a 20% solution of novolak resin in N,N'-dimethylacetamide are added. This blend is then painted onto 112–112E glass cloth and dried by baking for 60 minutes at 200° F. Resin pick-up as described in Example 10 is 41.8%. Aluminum strips of the type in Example 8 are used to prepare joints with 0.50 inch overlap and cured in a press for one hour at 300° C. and 200 pounds per square inch pressure. The adhesive joints are tested in the Instron Tensile Tester at 0.05 inch per minute at 77° F. and 550° F.

Average tensile shear strength obtained:

1,789 p.s.i. at 25° C.
1,220 p.s.i. at 288° C.

Example 12

The procedure of Example 1 is repeated but using 2',3',5',6'-acetophenonetetracarboxylic dianhydride (32.9 parts) in place of 3,3',4,4'-benzophenonetetracarboxylic dianhydride. The resulting solution is suitable for treatment as in Examples 1(a) through 1(e).

Example 13

The procedure of Example 2 is repeated but using 2',3',5',6'-acetophenonetetracarboxylic dianhydride (26.0 parts) in place of 3,3',4,4'-benzophenonetetracarboxylic dianhydride (32.2 parts).

Example 14

The procedure of Example 3 is repeated but using 2',3',5',6'-acetophenonetetracarboxylic dianhydride (265 parts) in place of 3,3',4,4'-benzophenonetetracarboxylic dianhydride (328 parts). The resulting solution is suitable for treatment as in Example 3(a).

Example 15

The procedure of Example 4 is repeated but using 2',3',5',6'-acetophenonetetracarboxylic dianhydride (27.1 parts) in place of 3,3',4,4'-benzophenonetetracarboxylic dianhydride (33.6 parts).

Example 16

The procedure of Example 5 is repeated but using 3,4'-diaminopropiophenone (5.03 parts) in place of 4,4'-diaminobenzophenone (6.93 parts). The resulting solution is suitable for treatment as in Example 5(a). The procedure of Example 5(b) is repeated but using 3,4'-diaminopropiophenone (0.170 part) in place of 4,4'-diaminobenzophenone (0.234 part).

We claim:

1. A polymer consisting essentially of the recurring structural unit

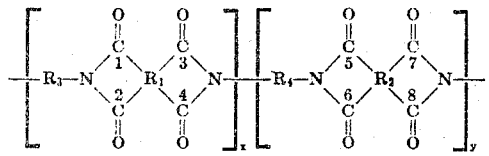

where $x$ and $y$ are whole numbers representing the number of bracketed units present; the carbonyl pairs 1,2; 3,4; 5,6; and 7,8 are attached directly to adjacent carbon atoms in $R_1$ and $R_2$ respectively, at least 20% (molar) $R_{1-4}$ contain a cross-linking group

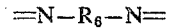

in which group one nitrogen atom is connected to a carbon atom in one polymer chain and the other nitrogen atom is connected to another carbon atom in an adjacent polymer chain and one of the carbon atoms attached to a nitrogen atom in the cross-linking group is also directly attached to a carbon atom and an aromatic carbon atom thereby providing a cross-linked polymeric structure, and each of $R_{1-4}$ and $R_6$ is selected from the group consisting of aliphatic, aromatic, carbocyclic and heterocyclic radicals.

2. A cross-linked polymer of claim 1 wherein $R_1$ and $R_2$ are from the group consisting of

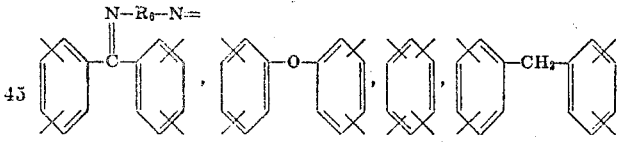

and $R_3$ and $R_4$ are selected from the group of alkylene

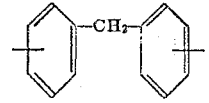

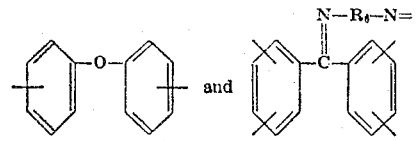

where $R_6$ is selected from the group consisting of alkylene and arylene.

3. A cross-linked polymer having the structural formula of claim 1 wherein $R_1$ and $R_2$ are organic radicals having the formula

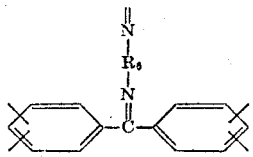

where $R_6$ is from the group consisting of alkylene and arylene.

4. A cross-linked polymer having the structural formula of claim 1 wherein $R_3$ and $R_4$ are hydrocarbon radicals having the formula

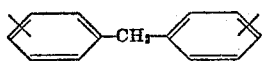

5. A cross-linked polymer having the structural formula of claim 1 wherein $R_3$ and $R_4$ are organic radicals having the formula

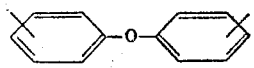

6. A cross-linked polymer having the structural formula of claim 1 wherein $R_3$ and $R_4$ are organic radicals having the formula

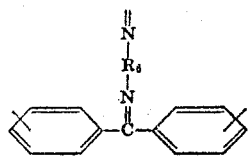

where $R_6$ is from the group consisting of alkylene and arylene.

7. An adhesive composition of the cross-linked polymer of claim 1.
8. An adhesive composition of the cross-linked polymer of claim 2.
9. A laminate with an adhesive layer of the cross-linked polymer of claim 1.
10. A laminated structure with lamina bonded by an adhesive of the cross-linked polymer of claim 2.
11. A film of the cross-linked polymer of claim 1.
12. A film of the cross-linked polymer of claim 2.
13. A process for producing a cross-linked polyimide which comprises reacting a diamine having the formula $H_2N-M-NH_2$ with a dianhydride of a tetracarboxylic acid having the formula

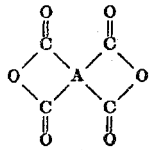

where A is a tetravalent organic radical with the two pairs of carbonyl groups

shown attached to A, being positioned so that the carbonyl groups in each pair are attached to adjacent carbon atoms in A, at least one of A and M containing an aromatic keto group, the compound(s) containing said group being present in an amount of at least 30% (molar) of the dianhydride present, the diamine being present in an amount of at least 15% (molar) excess over the dianhydride, said reaction being carried out at an elevated temperature until substantially all of the diamine is reacted.

14. The process of claim 13 in which the diamine is from the group consisting of hexamethylene diamine, methylene dianiline, oxydianiline and diaminobenzophenone and the dianhydride is from the group consisting of dianhydrides of benzophenonetetracarboxylic acid, oxydiphthalic acid, pyromellitic acid, and methylene diphthalic acid.

15. The process of claim 14 in which the reaction is initially carried out at a temperature below 50° C. until substantially all of the dianhydride is reacted, then the reaction product mixture is applied to a substrate and the mixture is heated until substantially all of the diamine is reacted.

16. In a process for forming a cross-linked polyimide coating upon a substrate wherein the polyimide coating composition is formed by reacting a diamine having the structural formula $H_2N-M-NH_2$ with a dianhydride of a tetracarboxylic acid having the structural formula

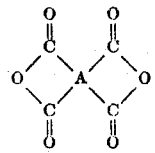

wherein A is a tetravalent organic radical with the two pairs of carbonyl groups

shown attached to A, being positioned so that the carbonyl groups in each pair are attached to adjacent carbon atoms in A, at least one of A and M containing an aromatic keto group, the compound(s) containing said group being present in an amount of at least 30% (molar) of the dianhydride present, the diamine being present in an amount of at least 15% (molar) excess over the dianhydride at a temperature below 50° C. until substantially all of the dianhydride is reacted, the steps which comprise:
 (a) applying the polyimide coating composition to a substrate; and subsequently
 (b) heating said polyimide coating composition to an elevated temperature until substantially all of the diamine is reacted.

References Cited
UNITED STATES PATENTS
3,179,634   4/1965   Edwards _____ 260—78

WILLIAM H. SHORT, *Primary Examiner.*

H. D. ANDERSON, *Assistant Examiner.*

U.S. Cl. X.R.

260—47, 65, 78, 45.7, 45.75, 824, 830, 849, 857, 37; 117—122, 161, 93; 156—331